(12) United States Patent
Jeffrey

(10) Patent No.: US 7,212,214 B2
(45) Date of Patent: May 1, 2007

(54) APPARATUSES AND METHODS FOR INTERPOLATING MISSING COLORS

(75) Inventor: Eric Jeffrey, Richmond (CA)

(73) Assignee: Seiko Epson Corporation, Tokyo (JP)

( * ) Notice: Subject to any disclaimer, the term of this patent is extended or adjusted under 35 U.S.C. 154(b) by 118 days.

(21) Appl. No.: 10/934,962

(22) Filed: Sep. 3, 2004

(65) Prior Publication Data

US 2006/0050082 A1 Mar. 9, 2006

(51) Int. Cl.
*G09G 5/00* (2006.01)

(52) U.S. Cl. .................................. 345/606; 345/667

(58) Field of Classification Search .................. None
See application file for complete search history.

(56) References Cited

U.S. PATENT DOCUMENTS

| | | | |
|---|---|---|---|
| 4,647,975 A | 3/1987 | Alston et al. | |
| 4,754,333 A | 6/1988 | Nara | |
| 4,876,590 A | 10/1989 | Parulski | |
| 6,510,254 B1 | 1/2003 | Nakami et al. | |
| 6,542,192 B2 | 4/2003 | Akiyama et al. | |
| 6,614,553 B2 | 9/2003 | Nakami et al. | |
| 6,677,991 B1 | 1/2004 | Ito | |
| 6,760,489 B1 * | 7/2004 | Kuwata | 382/300 |
| 2001/0002142 A1 | 5/2001 | Akiyama et al. | |
| 2002/0015162 A1 | 2/2002 | Hoshii et al. | |
| 2002/0085103 A1 | 7/2002 | Kondo et al. | |
| 2002/0129065 A1 * | 9/2002 | Shiohara | 707/513 |
| 2002/0186307 A1 | 12/2002 | Anderson | |
| 2003/0099410 A1 * | 5/2003 | Daigi | 382/298 |
| 2003/0122952 A1 | 7/2003 | Kuroiwa | |
| 2003/0147564 A1 * | 8/2003 | Lee | 382/300 |
| 2003/0169278 A1 | 9/2003 | Obrador | |
| 2003/0169818 A1 | 9/2003 | Obrador | |

OTHER PUBLICATIONS

Color Filter Array Demosaicking: New Method and Performance Measures, Wenmiao Lu, Student Member, IEEE, and Yap-Peng Tan, Member, IEEE, IEEE Transactions on Image Processing, vol. 12, No. 10, Oct. 2003, (pp. 1194-1210).
Color Plane Interpolation Using Alternating Projections, Bahadir K. Gunturk, Student Member, IEEE, Yucel Altunbasak, Senior Member, IEEE, and Russell M. Mersereau, Fellow, IEEE, IEEE Transactions on Image Processing, vol. 11, No. 9, Sep. 2002, (pp. 997-1013).

* cited by examiner

*Primary Examiner*—Mark Zimmerman
*Assistant Examiner*—Kevin Xu

(57) ABSTRACT

A hardware implemented method for interpolating missing colors is provided. In this method, the missing colors of a raw image received from an image capture device are interpolated using a first interpolation algorithm if the raw image is to be displayed on a display panel. It should be appreciated that the raw image is obtained through a color filter array. However, if the raw image is destined for output to a host, the missing colors of the raw image are interpolated using a second interpolation algorithm. An apparatus and a display controller for interpolating missing colors are also described.

21 Claims, 6 Drawing Sheets

APPARATUSES AND METHODS FOR INTERPOLATING MISSING COLORS

CROSS REFERENCE TO RELATED APPLICATIONS

This application is related to U.S. patent Publication No. 2002/0057265, filed on Oct. 23, 2001, and entitled "Display Driver, and Display Unit and Electronic Instrument Using the Same." The disclosure of this application, is incorporated herein by reference in its entirety for all purposes.

This application is related to U.S. patent Publication No. 2002/0018058, filed on Jul. 25, 2001, and entitled "RAM-Incorporated Driver, and Display Unit and Electronic Equipment Using the Same." The disclosure of this application, is incorporated herein by reference in its entirety for all purposes.

BACKGROUND OF THE INVENTION

1. Field of the Invention

This invention relates generally to computer graphics and, more particularly, to methods and apparatuses for interpolating missing colors.

2. Description of the Related Art

Each pixel of an image has a camera sensor associated with the pixel. The camera sensor contains a light sensitive photodiode that measures the brightness of light. Since photodiodes are monochrome devices, they are unable to tell the differences between different wavelengths of light. To provide red, green, and blue (RGB) color sensitivity, a color filter array is applied on top of the camera sensors to filter out the RGB components of light falling onto the camera sensors. The color filter array typically uses a 3-color red-green-blue pattern. For example, a popular color filter array is a Bayer filter that has an RGB filter pattern arranged in a quartet ordered in successive rows that alternate either red and green or blue and green filters.

Since each pixel has been made sensitive only to one color, the two missing pixels required for a full RGB value are estimated based on the color values of neighboring pixels via interpolation algorithms in the camera. Currently, small cameras (i.e., image capture devices) used in many small portable devices include the logic to interpolate the missing colors. Since these small cameras have limited memory and computing power, these small cameras can only use simple interpolation algorithms. As the resolution of the cameras increases to the mega-pixel range, higher quality interpolation algorithms are needed. However, these small cameras do not have the memory and computing power to utilize higher quality algorithms.

In view of the foregoing, there is a need to provide apparatuses and methods for interpolating the missing colors using higher quality interpolation algorithms in small portable devices.

SUMMARY OF THE INVENTION

Broadly speaking, the present invention fills these needs by providing hardware implemented methods and an apparatus for interpolating missing colors. It should be appreciated that the present invention can be implemented in numerous ways, including as a method, a system, or a device. Several inventive embodiments of the present invention are described below.

In accordance with a first aspect of the present invention, a hardware implemented method for interpolating missing colors is provided. In this method, the missing colors of a raw image received from an image capture device are interpolated using a first interpolation algorithm if the raw image is to be displayed on a display panel. It should be appreciated that the raw image is obtained through a color filter array. However, if the raw image is destined for output to a host, the missing colors of the raw image are interpolated using a second interpolation algorithm.

In accordance with a second aspect of the present invention, a display controller for interpolating missing colors is provided. The display controller includes a first interpolation module configured to convert a raw image to a red, green, and blue (RGB) format using a first interpolation algorithm. The raw image is obtained through a color filter array. In addition, the display controller includes selection circuitry in communication with the first interpolation module, a display buffer, and an image capture device interface. The selection circuitry is configured to output the raw image received from the image capture device interface to the display buffer or to output the converted image in RGB format received from the first interpolation module to the display buffer based upon a selection signal received by the selection circuitry.

In accordance with a third aspect of the present invention, an apparatus for interpolating missing colors is provided. The display controller includes: circuitry for converting a raw image to an RGB format using a first interpolation algorithm if the raw image is to be displayed on a display panel, whereby the raw image is obtained through a color filter array; circuitry for outputting the converted image in RGB format to a display buffer if the raw image is to be displayed on the display panel or outputting the raw image to the display buffer if the raw image is destined for output to a host; and circuitry for converting the raw image stored in the display buffer to the RGB format using a second interpolation algorithm. A central processing unit (CPU) in communication with the display controller is also included. The display controller additionally includes the display panel in communication with the display controller for displaying the converted image in RGB format using the first interpolation algorithm and includes an image capture device in communication with the display controller.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for hardware implemented methods and an apparatus for interpolating missing colors. It will be obvious, however, to one skilled in the art, that the present invention may be practiced without some or all of these specific details. In other instances, well known process operations have not been described in detail in order not to unnecessarily obscure the present invention.

The embodiments described herein provide an apparatus, display controllers, and hardware implemented methods for interpolating missing colors. Essentially, the application of interpolation algorithms to interpolate the missing colors of an image may be customized to the particular uses of the image. As will be explained in more detail below, in one embodiment, an interpolation algorithm is used to interpolate the missing colors of an image that is to be displayed on a display panel. However, if the image is to be captured, a different interpolation algorithm may be used to interpolate the missing colors.

Figure 1:
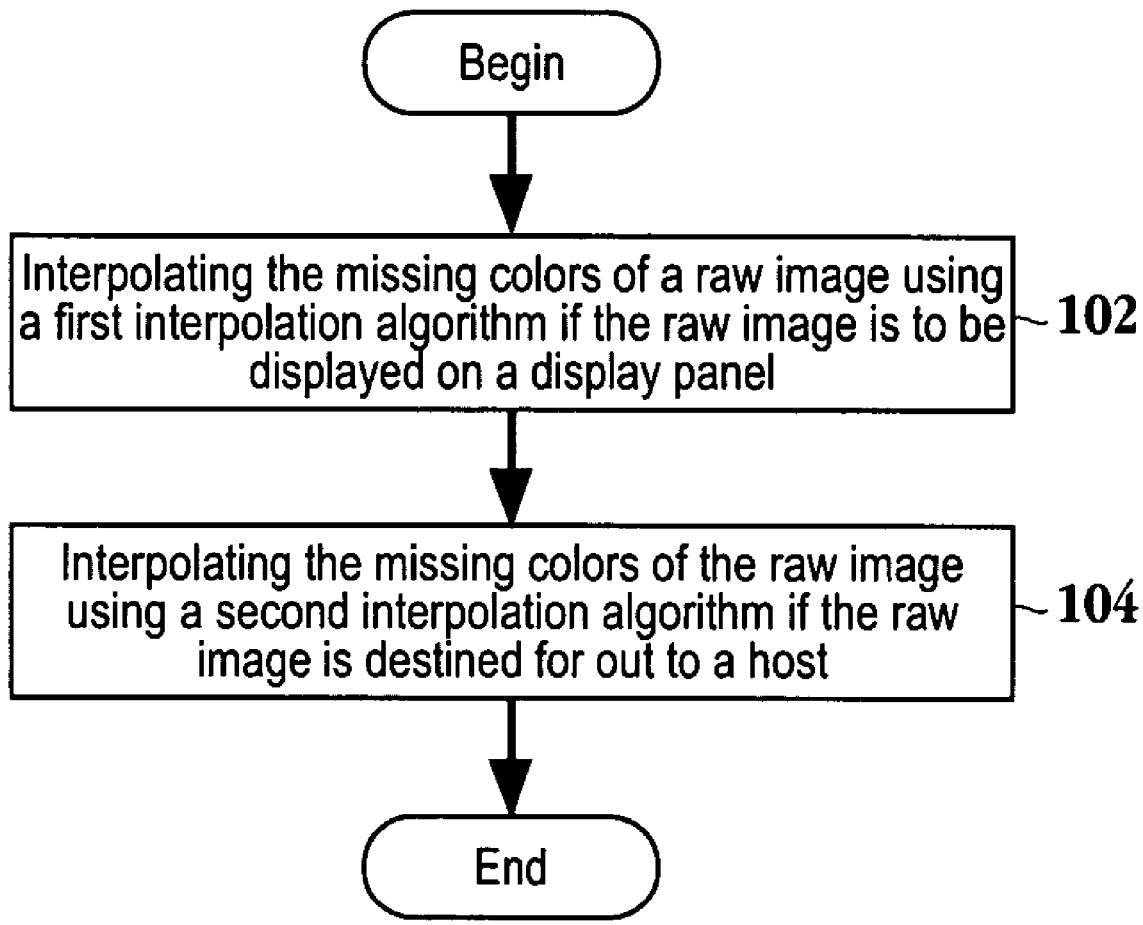
FIG. 1 is a flowchart diagram of a high level overview of a hardware implemented method for interpolating missing colors, in accordance with one embodiment of the present invention.

FIG. 1 is a flowchart diagram of a high level overview of a hardware implemented method for interpolating missing colors, in accordance with one embodiment of the present invention. An image capture device captures a raw image obtained through a color filter array. The raw image is comprised of single color per pixel data directly from the image capture device. One skilled in the art will appreciate that the color filter array applied on top of the image capture device sensors provide the color for each pixel by filtering out the red, green, and blue (RGB) components of light falling onto the image capture device sensors. Exemplary color filter arrays include a Bayer pattern, a pseudo-random Bayer pattern, a modified diagonal Bayer pattern, etc. In one embodiment, the raw image may be outputted for display on a display panel until the raw image is captured and encoded for output to a host (e.g., CPU, hard disk drive, optical disk drive, etc.). For example, a cell phone with an image capture device typically includes a display panel that shows what will appear in the field of view of the image capture device. When the user locates a desired field of view, the user pushes a button to capture the image in the field of view which sends the image to storage on the cell phone.

As shown in FIG. 1, starting in operation 102, if the raw image received from the image capture device is to be displayed on a display panel, the missing colors of the raw image are interpolated (i.e., estimated) using a first interpolation algorithm. Since the raw image is to be displayed in real time on the display panel, the first interpolation algorithm processes and interpolates the missing colors quickly such that the display panel may be updated in real time. As a result, in one embodiment, a simple interpolation algorithm optimized for speed may be used to quickly interpolate missing colors. Exemplary embodiments of simple interpolation algorithms include linear interpolation algorithms, nearest neighbor replication algorithms, bilinear interpolation algorithms, etc.

Although fast, simple interpolation algorithms yield lower quality images because of the algorithm's simplicity. For example, images from simple interpolation algorithms typically suffer from jagged edges or stair-step effects (i.e., aliasing). Lower quality images may be appropriate for the display panel because the display panel usually has a lower resolution than the image capture device. As a result, the color imperfections are relatively unnoticeable on a low resolution display panel. Furthermore, lower quality images are appropriate because the user mainly uses the display panel to acquire a field of view and not to view the images in any particular detail. In contrast, larger sized images (e.g., images greater than one mega-pixel) destined for storage and print require higher quality. As such, in operation 104, the missing colors of the raw image are interpolated using a second, more sophisticated, more complex, and higher quality interpolation algorithm if the raw image is destined for output to a host, in accordance with one embodiment of the present invention. Exemplary embodiments of higher quality interpolation algorithms include cubic interpolation algorithms, cubic spline interpolation algorithms, linear interpolation with Laplacian second-order correction terms algorithms, gradient-based interpolation algorithms, edge sensing interpolation algorithms, threshold-based variable number of gradients algorithms, pattern recognition interpolation algorithms, pattern matching interpolation algorithms, etc.

Figure 2:
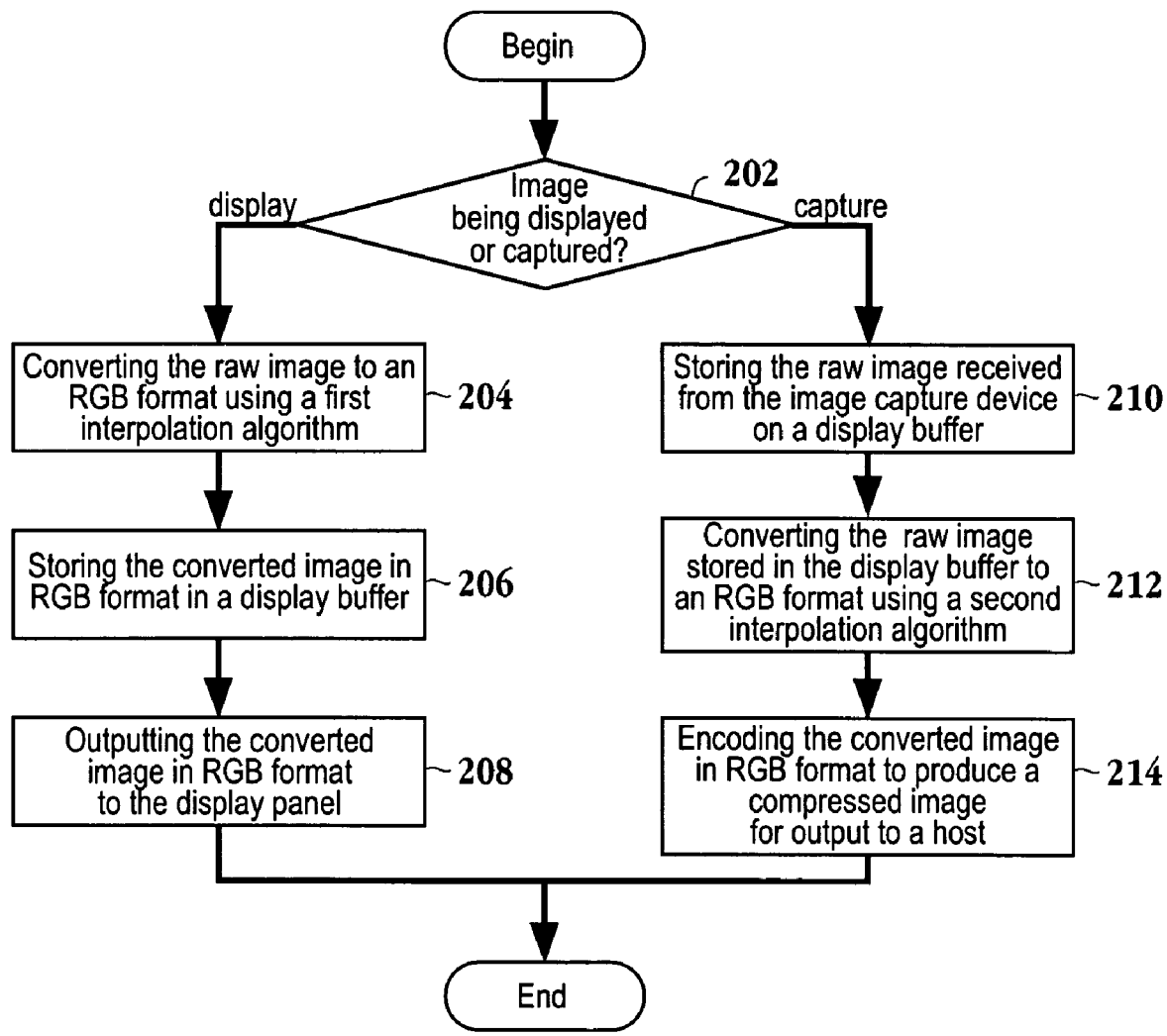
FIG. 2 is a more detailed flowchart diagram of a hardware implemented method for interpolating missing colors, in accordance with one embodiment of the present invention.

FIG. 2 is a more detailed flowchart diagram of a hardware implemented method for interpolating missing colors, in accordance with one embodiment of the present invention. Starting in operation 202, a determination is made as to whether the raw image received from an image capture device is to be displayed or destined for output to a host. Here, the user may select whether the image is to be displayed or stored for transmission to the host through a select button associated with the image capture device. If the raw image is to be displayed, the raw image is converted to an RGB format using a first interpolation algorithm in operation 204. As discussed above, in one embodiment, the first interpolation algorithm is an algorithm optimized for speed such that the display panel may be updated with the converted image in RGB format in real time. Subsequently, in operation 206, the converted image in RGB format is stored in a display buffer, in accordance with one embodiment of the present invention. In another embodiment, as will be explained in more detail below, the converted image is not stored in the display buffer when a RAM-integrated display panel is used. Thereafter, in operation 208, the converted image in RGB format is outputted to the display panel for presentation.

Returning to operation 202, if the raw image is to be captured or destined for output to a host, the raw image received from the image capture device is stored in the display buffer in operation 210. Subsequently, the raw image stored in the display buffer is converted to an RGB format using a second interpolation algorithm in operation 212. As discussed above, in one embodiment, the second interpolation algorithm is optimized for higher quality images instead of speed. In operation 214, the converted image in RGB format is then encoded to produce a compressed image for output to the host.

Figure 3:
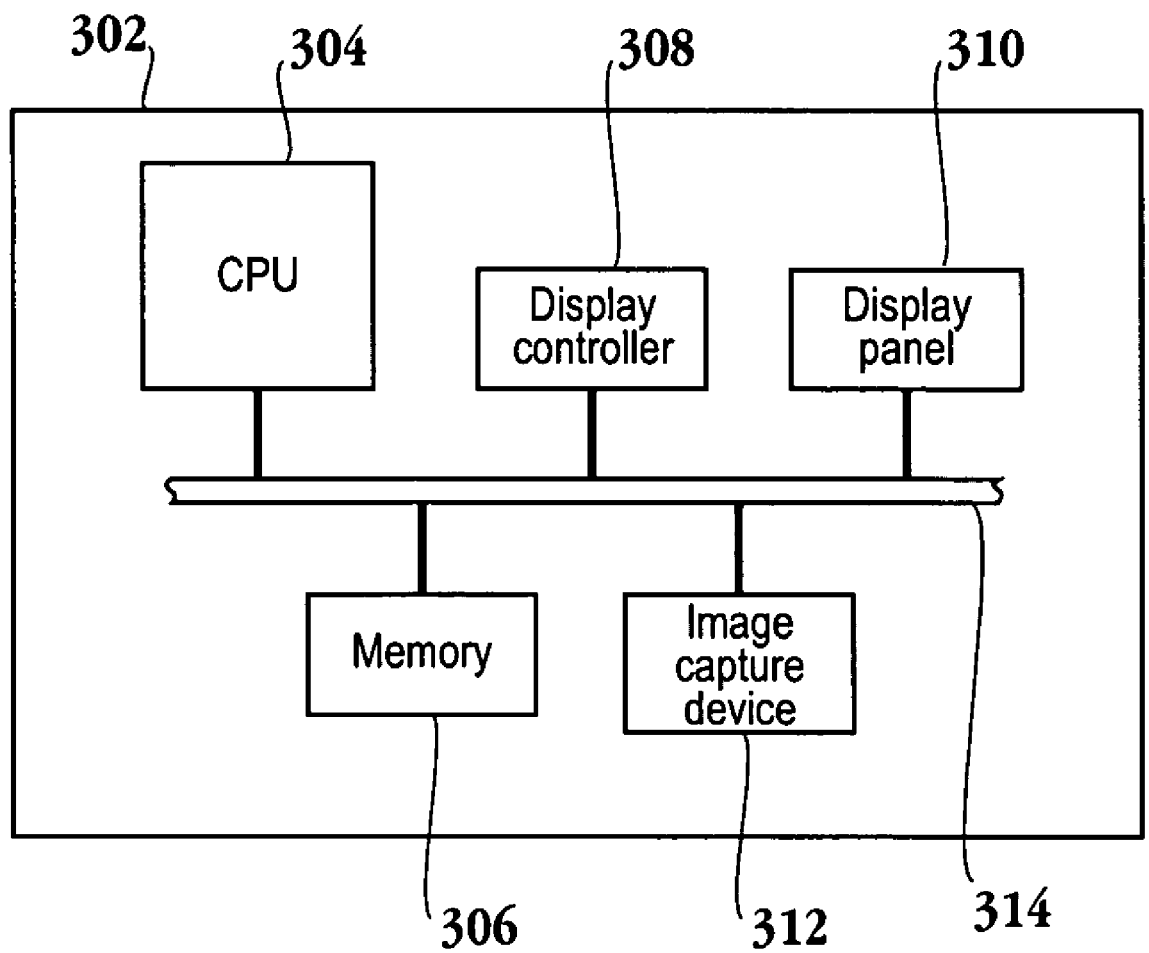
FIG. 3 is a simplified schematic diagram of an apparatus for interpolating missing colors, in accordance with one embodiment of the present invention.

FIG. 3 is a simplified schematic diagram of an apparatus for interpolating missing colors, in accordance with one embodiment of the present invention. Apparatus 302 includes any suitable type of computing device. For example, apparatus 302 may be a personal digital assistant, a cell phone, a web tablet, a pocket personal computer, etc. As shown in FIG. 3, apparatus 302 includes central processing unit (CPU) 304, memory 306, display controller 308, display panel 310, and image capture device 312. Display controller 308 is in communication with CPU 304, memory 306, image capture device 312, and display panel 310 through a common bus 314.

Image capture device 312 records photographic images as image data and outputs the raw image data to display controller 308. It should be appreciated that image capture device 312 may include a charge-coupled device to capture the image. A charge-coupled device (CCD) is a light-sensitive integrated circuit that stores and displays data for an image in such a way that each pixel in the image is converted into an electrical charge the intensity of which is related to a monochrome color. Of course, a complementary metal-oxide semiconductor (CMOS) chip, a widely used type of semiconductor, may be utilized in place of a CCD. Examples of image capture device 312 include cameras, digital cameras, video cameras, digital video cameras, etc.

Examples of memory 306 include any suitable memory types, such as static access memory (SRAM), dynamic random access memory (DRAM), etc. In one embodiment, the raw image or the converted image in RGB format is stored in a memory included within display controller 308. In another embodiment, memory 306, which is external to display controller 308, may be used to store the raw image or the converted image in RGB format.

Display panel 310 may include RAM-integrated display panels, liquid crystal displays (LCD), thin-film transistor (TFT) displays, cathode ray tube (CRT) monitors, televisions, etc. One skilled in the art will appreciate that RAM-integrated display panels include integrated chip display drivers with built-in random access memory (RAM) that drives a display section based on still-display data and moving-display data. In effect, raw image received from image capture device 312 may be temporarily stored in the built-in RAM. For more information on RAM-integrated panels, reference may be made to U.S. patent publication No. 2002/0057265, entitled "Display Driver, and Display Unit and Electronic Instrument Using the Same," and to U.S. patent publication No. 2002/0018058, entitled "RAM-Incorporated Driver, and Display Unit and Electronic Equipment Using the Same," and which are herein incorporated by reference.

The functionality described above for interpolating missing colors is incorporated into display controller 308. In one embodiment, display controller 308 includes circuitry for converting a raw image received from image capture device 312 to an RGB format using a first interpolation algorithm if the raw image is to be displayed on display panel 310. In another embodiment, circuitry for outputting the converted image in RGB format to a display buffer if the raw image is to be displayed or outputting the raw image to the display buffer if the raw image is destined for output to a host is included in display controller 308. Display controller 308 may additionally include circuitry for converting the raw image stored in the display buffer to the RGB format using a second interpolation algorithm.

Figure 4:
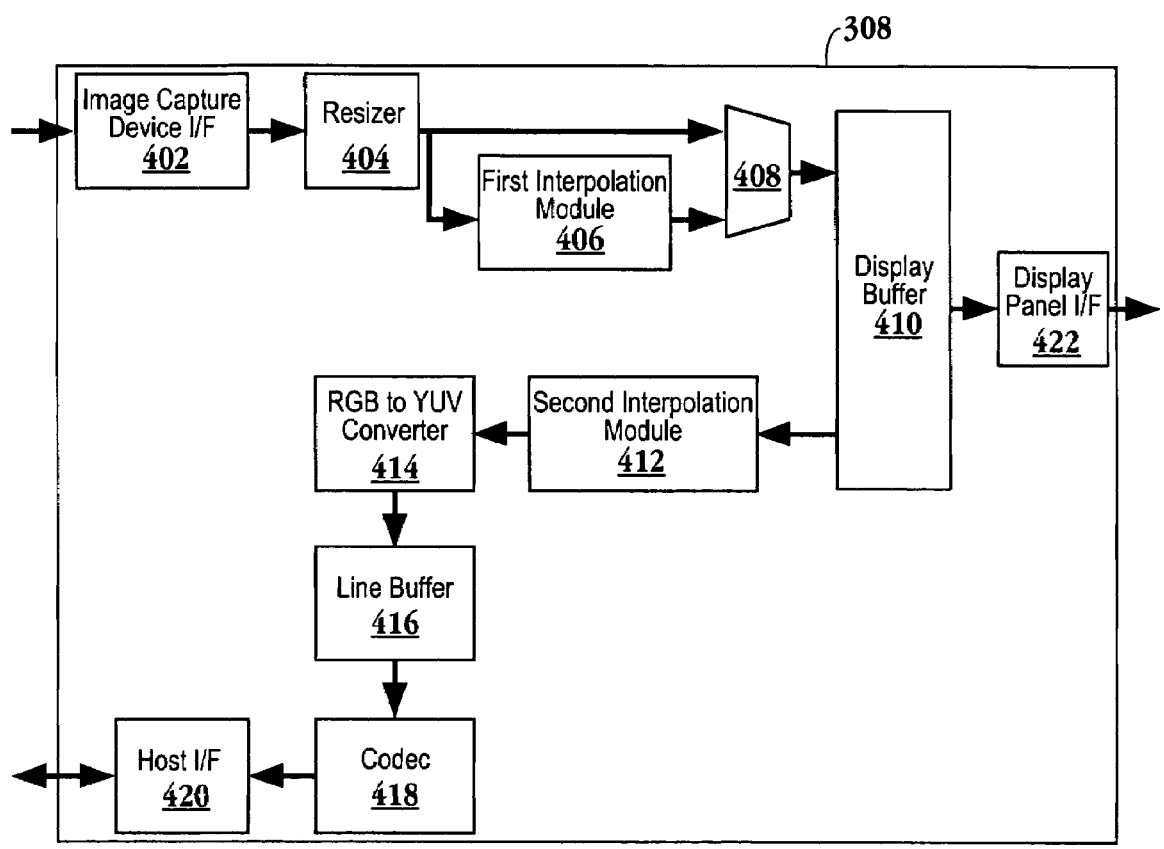
FIG. 4 is a more detailed schematic diagram of the display controller shown in FIG. 3.

FIG. 4 is a more detailed schematic diagram of display controller 308 shown in FIG. 3, in accordance with one embodiment of the present invention. As shown in FIG. 4, display controller 308 includes image capture device interface 402, resizer 404, first interpolation module 406, selection circuitry 408, display buffer 410, display panel interface 422, second interpolation module 412, RGB to Y, Cb, and Cr (YUV) converter 414, line buffer 416, compressor/decompressor (codec) 418, and host interface 420. In one embodiment, image capture device interface 402 first sends the raw image received from an image capture device to resizer 404. Resizer 404 resizes the raw image to the appropriate size of the display panel. For example, the image capture device may capture images in 640×640 pixel resolution. In contrast, the display panel may have a 160×160 pixel resolution. To fit the image within display panel, resizer 404 shrinks the 640×640 pixel image received from the image capture device to a 160×160 pixel resolution. It should be appreciated that resizer 404 is optional and may be excluded if the size of the image received from the image capture device is the same as the size of the display panel.

Subsequently, depending on whether the raw image is destined for output to a host or to be displayed on a display panel, selection circuitry 408 selects either the raw image received from image capture device interface 402 or the converted image in RGB format from first interpolation module 406, respectively, for output to display buffer 410. One skilled in the art will appreciate that selection circuitry 408 may be a 2:1 multiplexer. The output of the 2:1 multiplexer is either the raw image input received from image capture device interface 402 or the converted image in RGB format input from first interpolation module 406. The output selection depends on a third input (i.e., a select signal). In one embodiment, the third input is manually selected by a user. For example, during the acquisition of a field of view using the display panel, the third input has a 0 bit value that results in selection circuitry 408 outputting the converted image in RGB format received from first interpolation module 406. However, if the user manually triggers the capture of the image within the field of view, the third input changes to a 1 bit value that results in selection circuitry 408 outputting the raw image received from image capture device interface 402.

First interpolation module 406 includes the logic for interpolating missing colors using a first interpolation algorithm. Specifically, first interpolation module 406 uses a first interpolation algorithm to convert the raw image received from image capture device interface 402 to an RGB format. It should be appreciated that the first interpolation algorithm refers to the functionality performed by the hardware first interpolation module 406. As discussed above, in one embodiment, first interpolation module 406 uses an interpolation algorithm that is optimized for speed such that the display panel may be updated with the converted image in RGB format in real time.

Depending on whether the raw image is destined for output to a host, display buffer 410 stores the raw image or the converted image in RGB format, in accordance with one embodiment of the present invention. If the image is to be displayed on a display panel, display panel interface 422 retrieves the converted image in RGB format for display, in accordance with one embodiment of the present invention. In another embodiment, the converted image in RGB format may be directly displayed on a RAM-integrated panel without accessing or storing the converted image in RGB format in display buffer 410. Instead, the converted image in RGB format may be temporarily stored in the built-in RAM of the RAM-integrated panels.

If the raw image is destined for output to a host, the raw image received from image capture device interface 402 is temporarily stored in display buffer 410. Once display buffer 410 accumulates a whole frame of the raw image, second interpolation module 412 retrieves the frame of raw image and interpolates the missing colors of the raw image using a second interpolation algorithm. As discussed above, in one embodiment, second interpolation module 412 uses a different interpolation algorithm through interpolation module 406. The interpolation scheme of module 412 is optimized for higher quality images because larger sized images typically require higher quality interpolation.

Thereafter, in one embodiment, RGB to YUV converter 414 converts the converted image in RGB format to the appropriate YUV format suitable for codec 418. RGB to YUV converter 414 is optional and may be excluded if codec 418 accepts data in RGB format. The converted image in YUV format is then sent to line buffer 416 for temporary storage. Line buffer 416 is configured to store a portion of the converted image in YUV format received from second interpolation module 412 through RGB to YUV converter 414. One skilled in the art will appreciate that some codecs require line buffer 416 because these codecs cannot encode lines of image data but encode blocks of image data instead. For example, a JPEG codec is configured to encode a block that consists of eight lines of image data with eight pixels per line.

Codec 418 then compresses the converted image in YUV format and outputs the compressed combined image to a host through host interface 420. It should be appreciated that codec 418 includes any suitable type of codec that compresses display data. Exemplary codec schemes include a Joint Photographic Experts Group (JPEG) codec, a Graphic Interchange Format (GIF) codec, a Portable Network Graphics (PNG) codec, etc.

Furthermore, as discussed above, display buffer 410 stores either the raw image received from image capture device interface 402 or the converted image in RGB format from first interpolation module 406. If the raw image is destined for output to a host, then the display buffer 410 stores the raw image. As a result, display panel interface 422 retrieves the raw image for display on a display panel. Since the raw image is not in RGB format as required by most display panels, the display panel will display incorrect, meaningless images. To compensate for the incorrectly displayed images, logic may be included in display controller 308 that blanks the display until the raw image is encoded. In other words, display panel may be turned black for a short duration when the image is captured. When a user selects to capture an image, an interrupt may be triggered within apparatus that includes display controller 308. Once the apparatus receives the interrupt, the apparatus may program a register in display controller 308 to blank the display panel. The apparatus then waits until the completion of the encoding and then resets the register to unblank the display panel.

Figure 5:
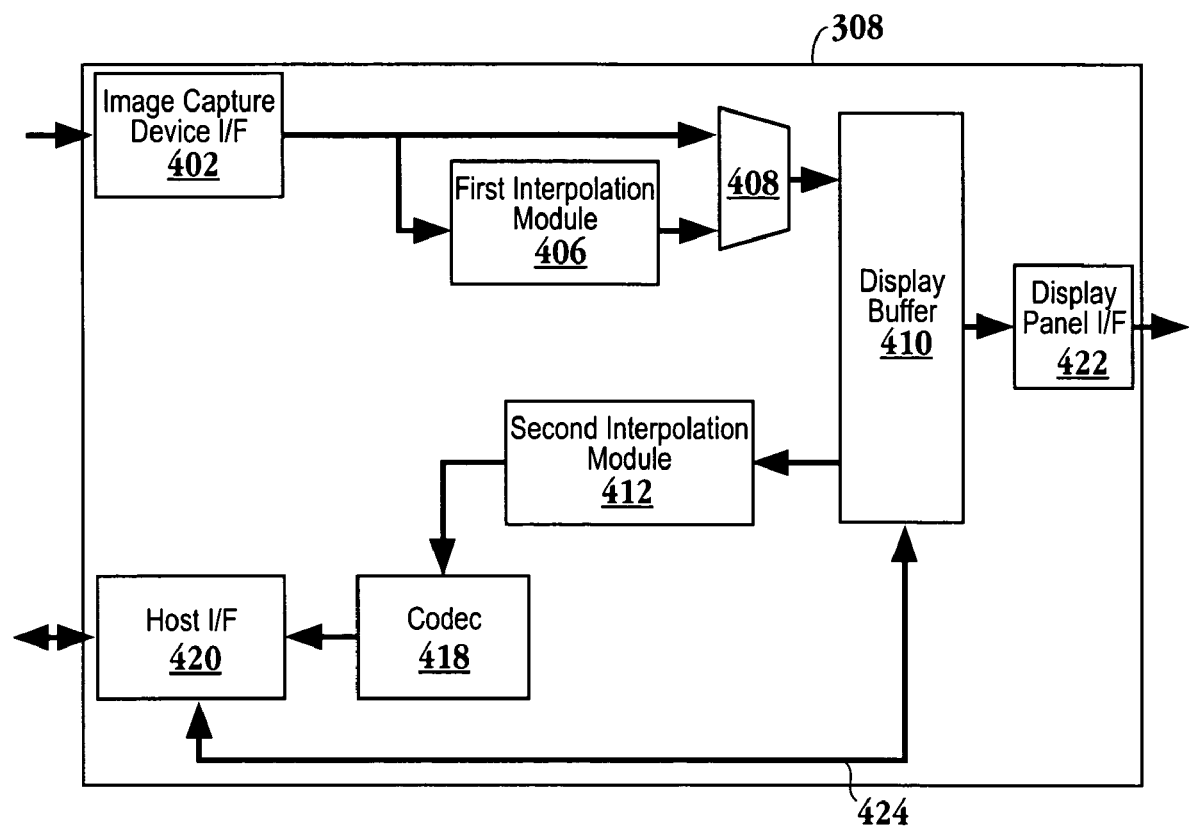
FIG. 5 is an alternative detailed schematic diagram of the display controller shown in FIG. 4.

FIG. 5 is an alternative detailed schematic diagram of display controller 308 shown in FIG. 4, in accordance with one embodiment of the present invention. As shown in FIG. 5, display controller 308 includes image capture device interface 402, first interpolation module 406, selection circuitry 408, display buffer 410, display panel interface 422, second interpolation module 412, codec 418, and host interface 420. Unlike display controller 308 shown in FIG. 4, display controller 308 shown in FIG. 5 does not include a resizer, an RGB to YUV converter, and a line buffer because, as discussed above, these components are optional. Alternatively, if a RAM-integrated display panel is used, the raw image is not sent to the panel, and the RAM-integrated display panel will continue to display the previous frame of image data.

Another difference is that host interface 410 may directly retrieve the raw image stored in display buffer 410 for output to the host instead of the data being retrieved by second interpolation module 412, in accordance with one embodiment of the present invention. As shown in FIG. 5, host interface 420 may directly retrieve the raw image stored in display buffer 410 along communication path 424. The raw image output, which has not been interpolated by second interpolation module 412, allows a device, such as a personal computer, in connection with display controller 308 to download and interpolate the raw image using a different interpolation algorithm.

Figure 6:
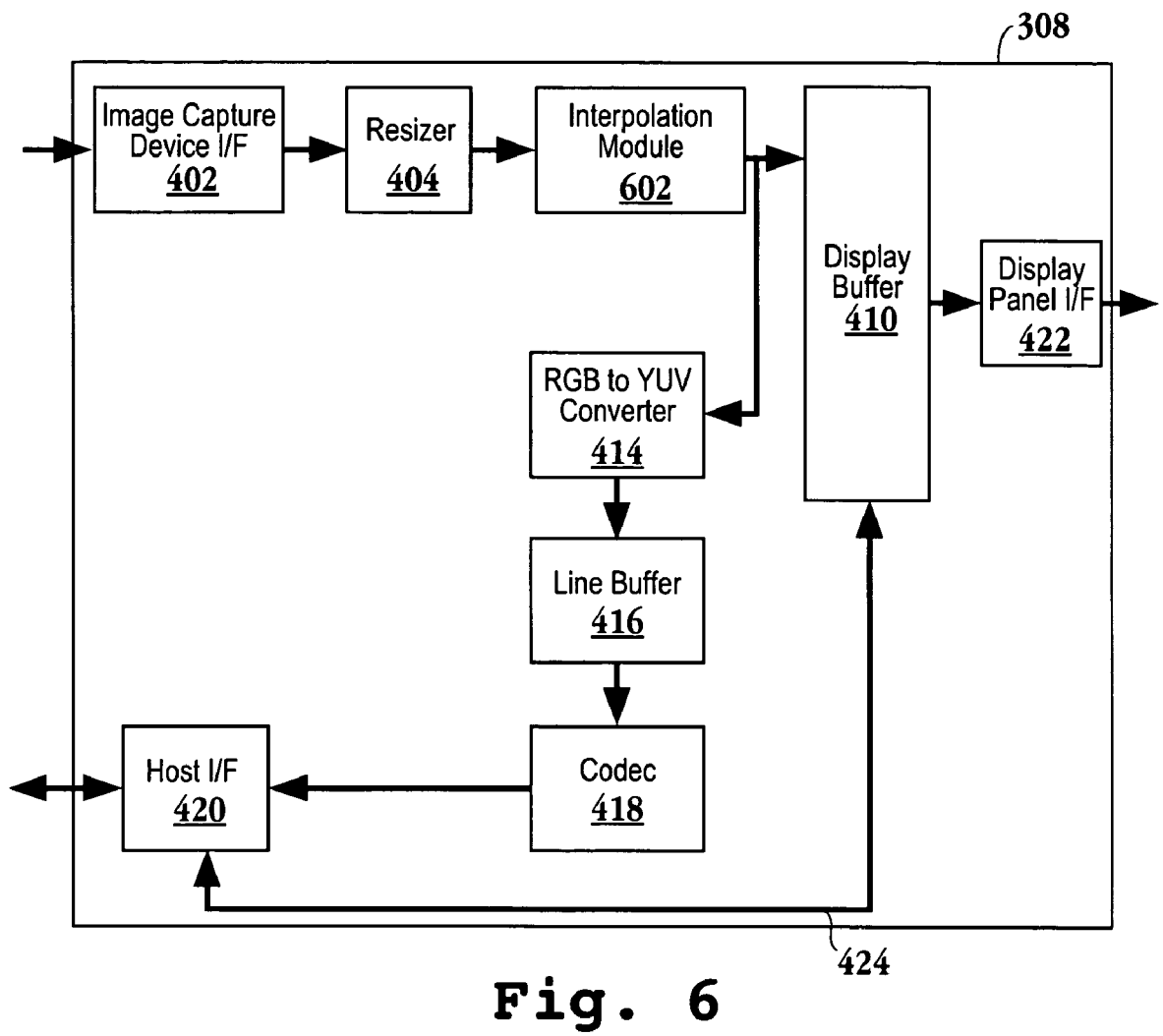
FIG. 6 is another more detailed schematic diagram of the display controller shown in FIG. 3.

FIG. 6 is another more detailed schematic diagram of display controller 308 shown in FIG. 3, in accordance with one embodiment of the present invention. As shown in FIG. 6, display controller 308 includes image capture device interface 402, resizer 404, display buffer 410, display panel interface 422, RGB to YUV converter 414, line buffer 416, codec 418, and host interface 420. Instead of two interpolation modules as shown in FIGS. 4 and 5, display controller 308 includes one interpolation module 602. Image capture device interface 402 first sends the raw image received from an image capture device to resizer 404 that resizes the raw image to the appropriate size of the display panel. Interpolation module 602 then interpolates the missing colors using an interpolation algorithm. Interpolation module 602 may include the logic to apply any suitable numbers of interpolation algorithms. In one exemplary embodiment, interpolation module 602 uses one interpolation algorithm for both output to display panel and capture to a host. In another embodiment, interpolation module 602 uses two different interpolation algorithms. For example, if the raw image received from image capture device interface 402 is to be displayed on a display panel, interpolation module 602 includes the logic to interpolate the missing colors using a first interpolation algorithm optimized for speed such that the display panel may be updated with the converted image in RGB format in real time. However, if the raw image is destined for output to a host, interpolation module 602 includes the logic to interpolate the missing colors using a second interpolation algorithm optimized for higher quality images.

After interpolation module 602 converts the raw image to RGB format, the converted image in RGB format may be stored in display buffer 410 and retrieved for display on a display panel through display panel interface 422. Alternatively, the converted image in RGB format may be destined and encoded for output to a host through RGB to YUV converter 414, line buffer 416, codec 418, and host interface 420. Another alternative is to have host interface 420 directly retrieve the converted image in RGB format from display buffer 410 along communication path 424.

In summary, the above described invention provides an apparatus, display controllers, and hardware implemented methods for interpolating missing colors of an image received from an image capture device. By moving interpolation operations to a display controller instead of the image capture device and applying the appropriate interpolation algorithm suited to how the image is utilized, a higher quality image may be produced. Furthermore, the limitation of using more sophisticated interpolation algorithms for capture and not display reduces processing power and bandwidth. As a result, small, portable devices with limited power, memory, and computing capability incorporating the above described invention can adequately display and capture images.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The above described invention may be practiced with other computer system configurations including hand-held devices, microprocessor systems, microprocessor-based or programmable consumer electronics, minicomputers, mainframe computers and the like. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

The invention claimed is:

1. A hardware implemented method for interpolating missing colors, comprising method operations of:
    interpolating the missing colors of an entire raw image received from an image capture device using a first interpolation algorithm if the raw image is to be displayed on a display panel, the raw image being obtained through a color filter array; and
    interpolating the missing colors of the entire raw image using a second interpolation algorithm if the raw image is destined for output to a host.

2. The hardware implemented method of claim 1, wherein the method operation of interpolating the missing colors of the raw image received from the image capture device using the first interpolation algorithm if the raw image is to be displayed on the display panel includes,
    converting the raw image to a red, green, and blue (RGB) format using the first interpolation algorithm; and
    outputting the converted image in RGB format to the display panel.

3. The hardware implemented method of claim 2, further comprising:
    storing the converted image in RGB format in a display buffer.

4. The hardware implemented method of claim 1, wherein the method operation of interpolating the missing colors of the raw image using the second interpolation algorithm if the raw image is destined for output to the host includes,
    storing the raw image received from the image capture device in a display buffer;
    converting the raw image stored in the display buffer to a red, green, and blue (RGB) format using the second interpolation algorithm; and
    encoding the converted image in RGB format to produce a compressed image for output to the host.

5. The hardware implemented method of claim 4, wherein the compressed image is selected from the group consisting of a Joint Photographic Experts Group (JPEG) image, a Graphic Interchange Format (GIF) image, and a Portable Network Graphics (PNG) image.

6. The hardware implemented method of claim 1, wherein the color filter array is selected from the group consisting of a Bayer pattern, a pseudo-random Bayer pattern, and a modified diagonal Bayer pattern.

7. The hardware implemented method of claim 1, wherein the first interpolation algorithm is selected from the group consisting of a linear interpolation algorithm, a nearest neighbor replication algorithm, and a bilinear interpolation algorithm.

8. The hardware implemented method of claim 1, wherein the second interpolation algorithm is selected from the group consisting of a cubic interpolation algorithm, a cubic spline interpolation algorithm, a linear interpolation with Laplacian second-order correction terms algorithm, a gradient-based interpolation algorithm, an edge sensing interpolation algorithm, a threshold-based variable number of gradients algorithm, a pattern recognition interpolation algorithm, and a pattern matching interpolation algorithm.

9. A display controller for interpolating missing colors, comprising:
    a first interpolation module configured to convert an entire raw image to a red, green, and blue (RGB) format using a first interpolation algorithm to generate a converted image, the raw image being obtained through a color filter array; and
    selection circuitry in communication with the first interpolation module, a display buffer, and an image capture device interface, the selection circuitry being configured to output the raw image received from the image capture device interface to the display buffer without previously being converted by any color interpolation module or to output the converted image in RGB format received from the first interpolation module to the display buffer based upon a selection signal received by the selection circuitry.

10. The display controller of claim 9, wherein the selection circuitry is configured to output the raw image to the display buffer if the raw image is being captured for output to a host.

11. The display controller of claim 9, wherein the selection circuitry is configured to output the converted image in RGB format to the display buffer if the raw image is being displayed on a display panel.

12. The display controller of claim 9, further comprising:
    a second interpolation module in communication with the display buffer, the second interpolation module being configured to convert the raw image stored in the display buffer to the RGB format.

13. The display controller of claim 12, further comprising:
    a codec in communication with the second interpolation module, the codec being configured to compress the converted image in RGB format.

14. The display controller of claim 9, further comprising:
    a display panel interface in communication with the display buffer, the display panel interface being configured to output the converted image in RGB format for display.

15. The display controller of claim 12, wherein the first interpolation algorithm is selected from the group consisting of a linear interpolation algorithm, a nearest neighbor replication algorithm, and a bilinear interpolation algorithm.

16. The display controller of claim 9, wherein the second interpolation algorithm is selected from the group consisting of a cubic interpolation algorithm, a cubic spline interpolation algorithm, a linear interpolation with Laplacian second-order correction terms algorithm, a gradient-based interpolation algorithm, an edge sensing interpolation algorithm, a threshold-based variable number of gradients algorithm, a pattern recognition interpolation algorithm, and a pattern matching interpolation algorithm.

17. The display controller of claim 9, wherein the selection circuitry is a 2:1 multiplexer.

18. An apparatus for interpolating missing colors, comprising:
   a display controller including,
      circuitry for converting an entire raw image to a red, green, and blue (RGB) format using a first interpolation algorithm to generate a converted image if the raw image is to be displayed on a display panel, the raw image being obtained through a color filter array,
      circuitry for outputting the converted image in RGB format to a display buffer if the raw image is to be displayed on the display panel or outputting the raw image to the display buffer if the raw image is destined for output to a host, and
      circuitry for converting the raw image stored in the display buffer to the RGB format using a second interpolation algorithm;
   a central processing unit (CPU) in communication with the display controller;
   the display panel in communication with the display controller for displaying the converted image in RGB format using the first interpolation algorithm; and
   an image capture device in communication with the display controller.

19. The apparatus of claim 18, further comprising:
   a memory in communication with the CPU.

20. The apparatus of claim 18, wherein the display panel is selected from the group consisting of a random access memory (RAM) integrated display, a liquid crystal display (LCD), a thin-film transistor (TFT) display, a cathode ray tube (CRT) monitor, and a television.

21. The apparatus of claim 18, wherein the image capture device is selected from the group consisting of a camera, a digital camera, a video camera, and a digital video camera.

* * * * *

UNITED STATES PATENT AND TRADEMARK OFFICE
CERTIFICATE OF CORRECTION

PATENT NO. : 7,212,214 B2  Page 1 of 1
APPLICATION NO. : 10/934962
DATED : May 1, 2007
INVENTOR(S) : Eric Jeffrey It is certified that error appears in the above-identified patent and that said Letters Patent is hereby corrected as shown below:

Column 10
Line 58, please change "of claim 12," to --of claim 9,--.

Column 10
Line 62, please change "of claim 9," to --of claim 12,--.

Signed and Sealed this

Third Day of June, 2008

JON W. DUDAS
*Director of the United States Patent and Trademark Office*